United States Patent [19]

Horacek

[11] Patent Number: 5,147,914
[45] Date of Patent: Sep. 15, 1992

[54] USE OF SPIROCYCLIC BORIC ACID ESTERS AS FLAME RETARDANTS IN PLASTICS

[75] Inventor: Heinrich Horacek, Linz, Austria

[73] Assignee: Chemie Linz Gesellschaft m.b.H., Linz, Austria

[21] Appl. No.: 678,939

[22] Filed: Apr. 3, 1991

[30] Foreign Application Priority Data

Apr. 24, 1990 [AT] Austria .................... 945/90

[51] Int. Cl.$^5$ .................................. C08K 5/55
[52] U.S. Cl. .................... 524/185; 524/183; 524/184
[58] Field of Search ................. 524/185, 183

[56] References Cited

U.S. PATENT DOCUMENTS

| | | | |
|---|---|---|---|
| 2,497,521 | 2/1950 | Trautman et al. | 252/33.6 |
| 3,087,960 | 4/1963 | Denny et al. | 558/291 |
| 3,629,052 | 12/1971 | Knoepfler et al. | 524/185 |
| 3,635,848 | 1/1972 | Rambosek | 521/105 |
| 3,772,357 | 11/1973 | Hamanaka et al. | 260/410.7 |
| 4,265,664 | 5/1981 | Saischek et al. | 106/18.13 |

FOREIGN PATENT DOCUMENTS

0085834 8/1983 European Pat. Off. .

OTHER PUBLICATIONS

Chemical Abstracts, vol. 92, 1980, p. 30.
Chemical Abstracts, vol. 99, 1983.
39–Textiles, vol. 78, 1973, p. 69.
Journal of Organometallic Chemistry, 329, (1987) 1–29.

*Primary Examiner*—Paul R. Michl
*Assistant Examiner*—Tae H. Yoon
*Attorney, Agent, or Firm*—Wenderoth, Lind & Ponack

[57] ABSTRACT

Use of spirocyclic boric acid esters of the general formula

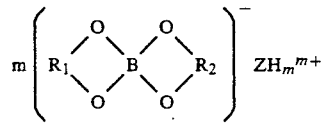

as flame retardants for plastics. $R_1$ and $R_2$ either independently of one another represent divalent radicals of alcohols having 2 to 6 OH groups or together represent the tetravalent radical of pentaerythritol, Z represents an N base and m represents an integer from 1 to 3.

10 Claims, No Drawings

USE OF SPIROCYCLIC BORIC ACID ESTERS AS FLAME RETARDANTS IN PLASTICS

The invention relates to the use of spirocyclic boric acid esters with alcohols having 2 to 6 OH groups and N-containing bases as flame retardants for plastics, plastics provided with a flame retardant finish using these boric acid esters, and spirocyclic boric acid esters with pentaerythritol, pentitols or hexitols and cations of guanidine, piperazine or melamine.

The use of halogen-containing spirocyclic boric acid esters as flame retardant additives for plastics is known from U.S. Pat. No. 4,265,664. Although good flameproofing properties are achieved here, a particular disadvantage of these flame retardants is their halogen content, which means that, in the event of a prolonged fire, toxic compounds of chlorine and bromine are released from the plastics provided with a flame retardant finish.

Halogen-free spirocyclic boron compounds are already known, but these are not used as flameproofing agents. Thus, for example, in U.S. Pat. No. 2,497,521 a boric acid-ethylene glycol complex compound which produces the corresponding amine salt of the spiroboron compound after heating with an amine is prepared by heating boric acid and ethylene glycol and isolated Boric acid and ethylene glycol are employed in a 30% excess. A number of compounds which increase the storage stability and corrosion resistance of hydrocarbon-based oils have been prepared in this way. U.S. Pat. No. 3,635,848 describes Na salts of spiroboric acid esters which have been prepared by heating boric acid with a large excess of a glycol, the water formed being distilled off in vacuo, and then heating the reaction product with metallic sodium. These compounds are suitable as catalysts for the preparation of polyurethanes and polyisocyanurates, for the trimerization of isocyanates and the like. According to U.S. Pat. No. 3,772,357, spirocyclic boron compounds which have a surface-active and antistatic action and increase the heat resistance of synthetic resins are obtained by reaction of 2 mol of a vicinal glycol containing more than 2 OH groups with 1 mol boric acid and subsequent esterification of the free OH groups with a carboxylic acid having 8°-22° C. atoms.

The object of the present invention was to discover halogen-free flame retardants having a good flameproofing action for plastics.

The object was achieved by spirocyclic boric acid esters which contain the cation of an N base.

The invention accordingly relates to the use of spirocyclic boric acid esters of the general formula I

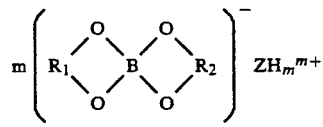

where $R_1$ and $R_2$ either independently of one another denote divalent radicals of alcohols having 2 to 6 OH groups, or together denote the tetravalent radical of pentaerythritol, Z denotes an N base and m denotes an integer from 1 to 3, as flame retardants for plastics.

Possible alcohols having 2 to 6 OH groups are either aliphatic or aromatic polyhydroxy alcohols such as are described, for example, in U.S. Pat. No. 2,497,521 or U.S. Pat. No. 3,087,960, in which similar boric acid esters are used as lubricants, transformer oils or intermediates for the preparation of petrol additives. Examples of polyhydroxy alcohols are glycols, such as, for example, ethylene glycol, propylene glycol, butylene glycol, diethylene glycol, dipropylene glycol, thiodiglycol, butanediol, pentanediol, hexanediol, 2,2-dimethyl-1,3-propanediol (neopentylglycol), 2,2,4-trimethyl-1,3-pentanediol, cyclohexanedimethanol or 2,2,4,4-tetramethyl-1,3-cyclobutanediol, glycerol, erythritol, pentaerythritol, sugar alcohols, such as, for example, pentitols, for example arabitol or xylitol, or hexitols, for example sorbitol or mannitol, pyrocatechol, resorcinol, hydroquinone, naphthohydroquinone or dihydroxybiphenyl. Preferred alcohols are neopentylglycol, pentitols and hexitols.

Possible N bases Z or cations thereof $ZH_m{}^{m+}$ are, for example, ammonium, mono-, di-, tri- and tetraalkylammonium, cycloalkylammonium, arylammonium or aralkylammonium ions, and the cations of ethylenediamine, guanidine, melamine, piperazine or dicyandiamide. Preferred N bases are guanidine and melamine. The cations of the N bases arise from addition of $H^+$ ions onto the N atoms of the N bases. For example, in the case of the unsubstituted or substituted ammonium ions m=1, the corresponding ammonium ion is formed by addition of 1 $H^+$ onto ammonia or onto the corresponding amine. In the case of ethylenediamine, for example, m can be 1 or 2, depending on whether 1 or 2 $H^+$ are added on, that is to say depending on whether 1 mol of ethylenediamine is reacted with 1 or 2 mol of boric acid and 2 or 4 mol of alcohol. In the case of melamine, for example, m can assume the values 1, 2 or 3, and accordingly 1, 2 or 3 $H^+$ can be added onto 1, 2 or 3 $NH_2$ groups.

The flame retardants according to the invention are preferably used for providing polyolefins and polyurethanes with a flame retardant finish.

The flame retardants according to the invention can be used by themselves or together with other flame retardants. For providing polyolefins with a flame retardant finish, they are advantageously used together with ammonium polyphosphate, and for providing polyurethanes with a flame retardant finish they are advantageously used together with melamine.

The invention furthermore relates to plastics which have been provided with a flame retardant finish and preferably contain 5 to 50% by weight of the spirocyclic boric acid esters according to the invention as flame retardants.

The invention furthermore relates to a process for providing plastics with a flame retardant finish, in which spirocyclic boric acid esters of the general formula I are added as flame retardants to the plastics or precursors thereof. Precursors of plastics are to be understood here as those reaction components which are reacted to give the finished plastic. For example, in the case of polyurethanes, the flame retardants according to the invention can preferably be added to precursors thereof, that is to say polyols or polyisocyanates.

The invention furthermore relates to new spirocyclic boric acid esters of the general formula I, where $R_1$ and $R_2$ either independently of one another denote divalent radicals of pentitols or hexitols or together denote the tetravalent radical or pentaerythritol, Z denotes guanidine, piperazine or melamine and m denotes an integer from 1 to 3.

In addition to the good flame retardant action, another advantage of the flame retardants according to the invention is that they have high boiling or decomposition points in the range from about 260° to 360° C., which means that they can also be incorporated at high temperatures into the plastics to be provided with a flame retardant finish. This is advantageous above all in the case of thermoplastics, into which the flame retardant is usually incorporated in the melt, for example in an extruder.

5 to 50% by weight of the boric acid esters according to the invention, based on the plastic having a flame retardant finish, are preferably added to the plastics to be provided with a flame retardant finish, according to the fire protection required or the fire protection class. The flame retardant action can be intensified further by addition of synergists, for example organic or inorganic phosphorus compounds, such as, for example, ammonium polyphosphate or phosphoric acid esters, or metal oxides, such as, for example, antimony oxide.

The flame retardants according to the invention are prepared by reaction of 1 mol of boric acid with 2 mol, if $R_1$ is the same as $R_2$ of an alcohol of the general formula $R_1(OH)_n$, or, if $R_1$ is not the same as $R_2$, with 1 mol of this alcohol and then with 1 mol of an alcohol of the general formula $R_2(OH)_n$, where $R_1$ and $R_2$ are as defined above and n represents an integer from 2 to 6, or if $R_1$ and $R_2$ together represent the tetravalent radical of pentaerythritol, with 1 mol of pentaerythritol, in the presence of at least 1 equivalent of an N base or salt thereof at a temperature of 20° to 200° C. in a diluent. In the case of monoacidic N bases, for example monoamine derivatives, at least 1 mol of the N base and in the case of diacidic N bases, for example ethylenediamine, at least ½ mol of the N base, and in the case of triacidic N bases, for example melamine, at least ⅓ mol of the N base is used.

Instead of boric acid, it is also possible to use dehydrated forms thereof, such as, for example, metaboric acid or boron trioxide. The boric acid is usually first reacted with the alcohols, and the N base or salt thereof is then added, whereupon the boric acid ester initially formed is converted from the acid form into the salt form. Guanidine carbonate is preferably added as the salt of an N base, the boric acid ester being converted into the guanidinium salt with evolution of $CO_2$. Examples of diluents which can be used are water, methanol, ethanol, toluene or xylene. The reaction temperature is preferably 50° to 150° C.

EXAMPLE 1

360 ml of ethanol, 14.8 g (0.24 mol) of boric acid and 50 g (0.48 mol) of neopentylglycol were initially introduced into a three-necked flask with a stirrer, reflux condenser and thermometer and the mixture was boiled under reflux for two hours. It was then cooled to 65° C., and 21.6 g (0.12 mol) of guanidine carbonate were slowly added. The mixture was boiled under reflux for a further two hours, $CO_2$ being split off and a white precipitate being formed, and after cooling to room temperature the precipitate was filtered off with suction and dried at 70° C. The sublimation point of the resulting product (guanidinium dineopentylglycol-borate) is 275°–285° C.

| Elemental analysis: | % C | % H | % N |
| --- | --- | --- | --- |
| theoretical | 48.0 | 9.5 | 15.3 |
| experimental | 47.7 | 9.5 | 15.6 |

EXAMPLE 2

182.2 g (1 mol) of mannitol, 30.9 g of boric acid (0.5 mol) and 750 ml of distilled water were boiled under reflux in a three-necked flask with a stirrer, reflux condenser and thermometer for 2 hours. The mixture was then evaporated, 213 g of dimannitol-boric acid having a melting point of 148° C. being obtained.

| Elemental analysis: | % C | % H | % B |
| --- | --- | --- | --- |
| theoretical | 38.7 | 6.7 | 3.0 |
| experimental | 38.5 | 6.5 | 3.1 |

30 g (0.08 mol) of the resulting dimannitol-boric acid, 7.26 g (0.04 mol) of guanidine carbonate and 85 ml of ethanol were then brought to the boiling point in a 500 ml flask. After the solution had been boiled for 5 hours, it was concentrated in a rotary evaporator and cooled to room temperature, a precipitate of guanidinium dimannitol-borate of melting point 175° C. being obtained.

| Elemental analysis: | % C | % H | % N |
| --- | --- | --- | --- |
| theoretical | 36.2 | 7.0 | 9.7 |
| experimental | 35.8 | 7.5 | 10.2 |

EXAMPLE 3

136.2 g (1 mol) of pentaerythritol in 862.5 g of ethanol were initially introduced into a 2 l flask with a stirrer, thermometer and condenser and heated up to the boiling point (79° C.). As soon as the solution was clear, 61.8 g (1 mol) of boric acid were added, the mixture was kept at the boiling point for a further 2 hours and 90.1 g (0.5 mol) of guanidine carbonate were then added. After the end of the evolution of $CO_2$, the mixture was cooled to room temperature. The precipitate formed (guanidinium pentaerythrityl-borate) had a melting point of 375° C.

| Elemental analysis: | % C | % H | % N |
| --- | --- | --- | --- |
| theoretical | 35.5 | 7.0 | 20.7 |
| experimental | 35.3 | 7.1 | 21.0 |

EXAMPLE 4

20.0 g (0.0925 mol) of dineopentylglycol-boric acid, which was obtained analogously to Example 1 by reaction of boric acid and neopentylglycol in ethanol and subsequent stripping off of ethanol and water, were dissolved in 93 ml of ethanol in a 500 ml four-necked flask, and 11.7 g (0.0925 mol) of melamine were added. After the mixture had been boiled under reflux at 78° C. for 5 hours, some of the solvent was stripped off, melamine dineopentylglycol-borate of melting point 285° C. crystallizing out.

| Elemental analysis: | % C | % H | % N |
|---|---|---|---|
| theoretical | 45.6 | 7.9 | 24.6 |
| experimental | 45.3 | 7.5 | 25.0 |

EXAMPLE 5

30 g (0.08 mol) of dimannitol-boric acid, which was obtained according to Example 2, were boiled under reflux with 10.2 g (0.08 mol) of melamine in 85 ml of water for 6 hours. The mixture was then evaporated on a rotary evaporator, melamine dimannitol-borate of melting point 160° C. being obtained.

| Elemental analysis: | % C | % H | % N |
|---|---|---|---|
| theoretical | 36.1 | 6.2 | 16.9 |
| experimental | 35.8 | 6.6 | 18.4 |

EXAMPLE 6

34 g (0.25 mol) of pentaerythritol, 15.5 g (0.25 mol) of boric acid and 150 g of ethanol were heated to the boiling point in a round-bottomed flask and were kept at the boiling point for 1 hour, while stirring. 31.5 g (0.25 mol) of melamine were then added and the mixture was boiled under reflux for a further 5 hours. After the solution had been concentrated, a precipitate of melamine pentaerythrityl-borate having a decomposition temperature of 400° C. was obtained.

| Elemental analysis: | % C | % H | % N |
|---|---|---|---|
| theoretical | 35.6 | 5.6 | 31.1 |
| experimental | 35.5 | 6.0 | 31.8 |

EXAMPLE 7

34 g (0.25 mol) of pentaerythritol, 15.5 g (0.25 mol) of boric acid and 150 g of ethanol were brought to the boiling point in a round-bottomed flask and kept at the boiling point for 1 hour, while stirring. 21 g (0.25 mol) of piperazine were then added and the mixture was boiled under reflux for a further 5 hours. After the solution had been evaporated, a residue of piperazine pentaerythrityl-borate of melting point 350° C. was obtained.

| Elemental analysis: | % C | % H | % N |
|---|---|---|---|
| theoretical | 47.3 | 7.5 | 12.3 |
| experimental | 47.2 | 7.6 | 12.1 |

EXAMPLE 8

34 g (0.25 mol) of pentaerythritol, 15.5 g (0.25 mol) of boric acid and 150 g of ethanol were brought to the boiling point in a round-bottomed flask and kept at the boiling point for 1 hour, while stirring. 15 g (0.25 mol) of ethylenediamine were then added and the mixture was boiled under reflux for a further 6 hours. After the solution had been evaporated, a residue of ethylenediamine pentaerythrityl-borate of melting point 320° C. was obtained.

| Elemental analysis: | % C | % H | % N |
|---|---|---|---|
| theoretical | 41.2 | 8.3 | 13.7 |
| experimental | 41.4 | 8.1 | 13.9 |

EXAMPLE 9

To demonstrate the good flame retardant action of the flame retardants according to the invention, flexible polyurethane foams having a density of 21 kg/m$^3$ were produced in accordance with the following recipe using in each case 10% by weight of the flame retardants according to Examples 1 to 6 and 10% by weight of melamine, and, for comparison, using 20% by weight of melamine as the flame retardant:

71.5 parts by weight of polyol (POLYURAX 1408, Dow), 14 parts by weight of melamine (Chemie Linz), 14 parts by weight of the particular flame retardant, 2.9 parts by weight of water, 1.4 parts by weight of diethanolamine 88% as a crosslinking agent, 0.07 part by weight of DABCO 33LV (33% strength solution of triethylenediamine in dipropylene glycol, Air Products), 0.036 part by weight of NIAX A1 (UCC) and 0.07 part by weight of dibutyltin dilaurate, as catalysts, and 0.18 part by weight of Polyurax SH209 (DOW), as a foam stabilizer, were homogenized and the mixture was then foamed with 36.5 parts by weight of toluylidene diisocyanate (TDI 80, Bayer). The resulting polyurethane foams (combustion modified high resilient foam, index 106) were tested for their burning properties in accordance with BS (British Standard) 5852 Crib 5, a maximum weight loss of 60 g being permitted when about 1 kg of the foam is exposed to flames. The values of the burning properties of the various polyurethane foams are summarized in Table 1, FR1 to FR6 denoting the flame retardants prepared according to Examples 1 to 6.

TABLE 1

Burning properties of polyurethane foams provided with a flame retardant finish, in accordance with BS 5852 Crib 5

| Flame retardant | % by weight | Sample weight (g) | Weight loss (g) |
|---|---|---|---|
| Melamine | 20 | 1000 | 50 |
| FR1 + melamine | 10 + 10 | 990 | 20 |
| FR2 + melamine | 10 + 10 | 1020 | 30 |
| FR3 + melamine | 10 + 10 | 1050 | 25 |
| FR4 + melamine | 10 + 10 | 980 | 30 |
| FR5 + melamine | 10 + 10 | 1010 | 40 |
| FR6 + melamine | 10 + 10 | 1030 | 40 |

*FR1 to FR6: flame retardant according to Example 1 to 6

EXAMPLE 10

To test the flame retardant action of the flame retardants according to the invention in polypropylene, the flame retardants according to Examples 1 to 6 (FR1 to FR6) were each mixed with ammonium polyphosphate (EXOLIT 422, Hoechst Celanese) in a ratio of 35% by weight of the particular FR and 65% by weight of ammonium polyphosphate, the mixture was incorporated in an amount of 25% by weight into polypropylene (DAPLEN RT 58 from PCD, Vienna) at a melting temperature of 220° C. in a single-screw laboratory extruder and the mixture was then pressed to sample sheets 3.2 mm thick. For a comparison experiment, 34% by weight of MASTERFLAM AF 709, a flame retardant from Vamp (Italy) based on nitrogen and phosphorus, was incorporated into the polypropylene and the mixture was extruded to sheets 3.2 mm thick. The polypropylene sheets provided with a flame retardant finish were investigated for their burning properties in accordance with UL 94 (Underwriters Laboratories). The corresponding values are summarized in Table 2, VO denoting a maximum burning time of 10 seconds without after-burning and after-glowing, and V2 denoting a maximum after-burning time of 30 seconds.

TABLE 2

Burning properties of polypropylene provided with a flame retardant finish, in accordance with UL 94

| Flame retardant | % by weight | Burning properties (UL 94) |
| --- | --- | --- |
| MASTERFLAM AF 709 | 34 | V0 |
| 35% FR1 + 65% ammonium polyphosphate | 25 | V0 |
| 35% FR2 + 65% ammonium polyphosphate | 25 | V2 |
| 35% FR3 + 65% ammonium polyphosphate | 25 | V0 |
| 35% FR4 + 65% ammonium polyphosphate | 25 | V0 |
| 35% FR5 + 65% ammonium polyphosphate | 25 | V2 |
| 35% FR6 + 65% ammonium polyphosphate | 25 | V0 |

I claim:

1. A plastic composition containing a plastic and a flame retardant amount of halogen free spirocyclic boric acid esters of the formula I

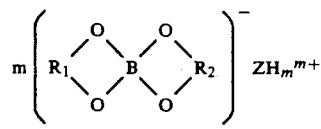

where $R_1$ and $R_2$ either independently of one another denote divalent radicals of alcohols having 2 to 6 OH groups, or together denote the tetravalent radical of pentaerythritol, Z denotes an N base and m denotes an integer from 1 to 3.

2. The plastic composition, according to claim 1, wherein the alcohols are pentitols or hexitols.

3. The plastic composition, according to claim 1, wherein the alcohol is neopentylglycol.

4. The plastic composition, according to claim 1, wherein the N-base is guanidine.

5. The plastic composition, according to claim 1, wherein the N-base is melamine.

6. The plastic composition, according to claim 1, wherein the plastic is a polyolefin or polyurethane.

7. The plastic composition, according to claim 1, wherein the plastic is a polyolefin and ammonium polyphosphate is present as an additional flame retardant.

8. The plastic composition, according to claim 1, wherein the plastic is a polyurethane and melamine is present as an additional flame retardant.

9. The plastic composition, according to claim 1, containing 5 to 50% by weight of the boric acid ester of Formula I.

10. The process for providing plastics with a flame retardant finish, wherein the spirocyclic boric acid esters of Formula I, according to claim 1, are added as flame retardants to the plastic.

* * * * *